United States Patent [19]

Spiller

[11] 3,833,467

[45] Sept. 3, 1974

[54] MODIFICATION OF CLAY TO IMPROVE ELECTROSTATIC DEPOSITION

[75] Inventor: Lester L. Spiller, Indianapolis, Ind.

[73] Assignee: Ransburg Electro-Coating Corp., Indianapolis, Ind.

[22] Filed: Apr. 26, 1973

[21] Appl. No.: 354,637

Related U.S. Application Data

[63] Continuation of Ser. No. 768,342, Oct. 17, 1968, abandoned.

[52] U.S. Cl...... 162/181 D, 106/288 B, 106/308 N, 117/93.4 R, 117/123 C, 162/184, 162/186, 162/192
[51] Int. Cl............................................. D21d 3/00
[58] Field of Search ....... 162/158, 181, 181 D, 182, 162/184, 186, 192; 106/308 N, 288 B, 288 Q; 117/123 C, 93.4 R; 260/567.6 M

[56] References Cited
UNITED STATES PATENTS

| | | | |
|---|---|---|---|
| 2,030,483 | 2/1936 | Vong | 162/184 |
| 2,666,699 | 1/1954 | McQuiston et al. | 162/182 X |
| 2,694,633 | 11/1954 | Pattilloch | 162/182 |
| 2,807,543 | 9/1957 | McQuiston | 162/182 X |
| 3,461,032 | 8/1969 | Lichtenberger et al. | 162/192 X |
| 3,477,904 | 11/1969 | Mehltretter | 162/181 X |

OTHER PUBLICATIONS

Reif, "An Electrostatic Process For Applying Dry Coatings On Paper," TAPPI, Oct. 1955, Vol. 38, No. 10, pp. 607–609.

*Primary Examiner*—S. Leon Bashore
*Assistant Examiner*—Arthur L. Corbin
*Attorney, Agent, or Firm*—Merrill N. Johnson; David H. Badger

[57] ABSTRACT

Dry clay is electrostatically deposited on wet paper as it is formed on a Fourdrinier machine. This clay is coated with a cationic surface active agent and especially a dialkyl dimethyl ammonium chloride in order to minimize the formation of clay clusters which adhere to the electrostatic equipment and which drop off in the form of slugs to mar the paper. Pretreatment of the clay with a mild alkaline agent such as sodium carbonate causes the cationic agent to be more effective and the treatment to be more durable.

5 Claims, 1 Drawing Figure

PATENTED SEP 3 1974
3,833,467
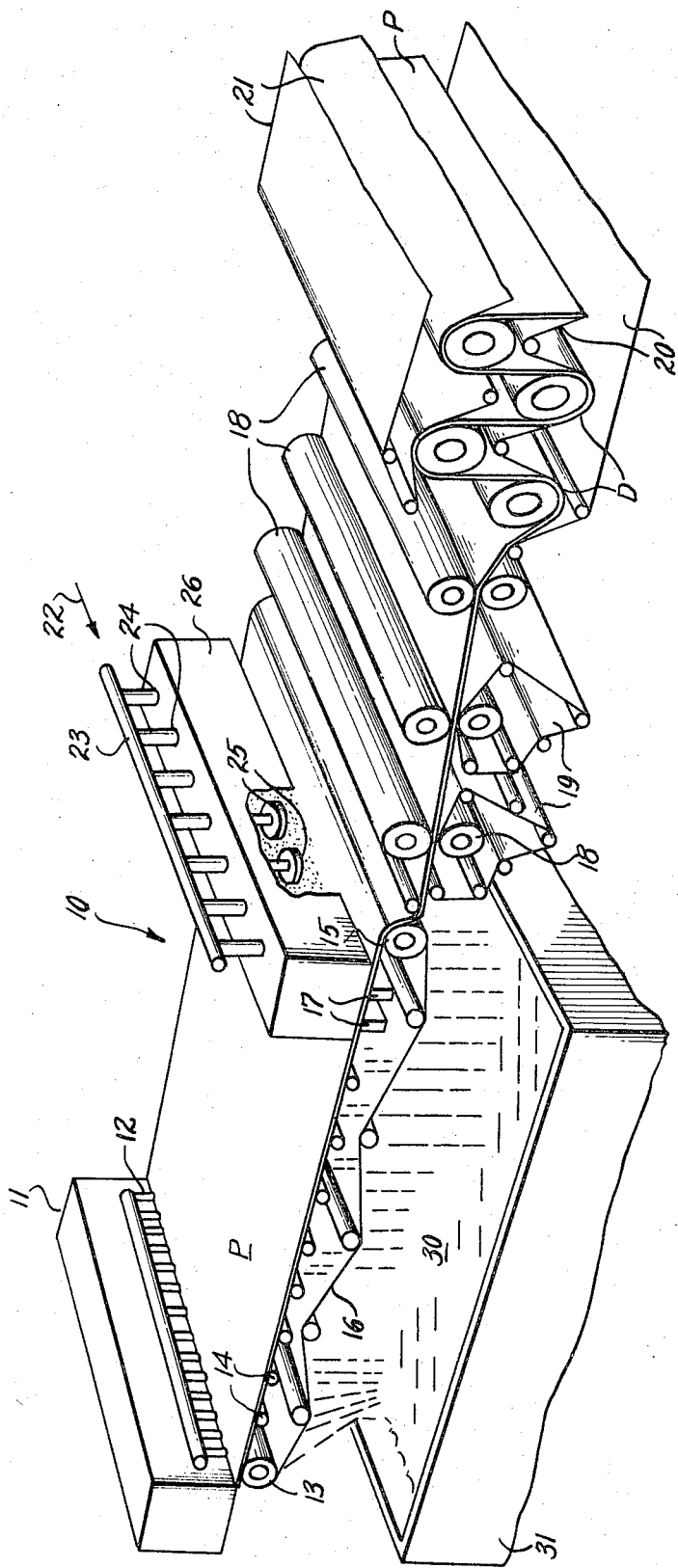
INVENTOR.
LESTER L. SPILLER

MODIFICATION OF CLAY TO IMPROVE ELECTROSTATIC DEPOSITION

This is a continuation, of Application Ser. No. 768,342, filed Oct. 17, 1968, now abandoned.

The present application relates to the electrostatic application of clay, especially to wet paper on the Fourdrinier machine.

The electrostatic application of dry clay to wet paper on the Fourdrinier machine provides many advantages, since this enables the deposited clay to be concentrated at the surface of the paper without introducing large amounts of water into the paper at the dry end of the machine. Unfortunately, when the dry clay particles are blown to electrostatic spray equipment positioned above the Fourdrinier wire at the wet end of the machine, the clay particles tend to form clusters which adhere to the diffuser surfaces on the spray equipment and these clusters break off from time to time forming slugs which mar the paper surface.

it has now been found that the tendency of the clay particles to cluster and form slugs can be countered by modifying the clay to be slightly alkaline, e.g., an initial pH of 7.0–8.5, as by treatment with any alkaline material illustrated by sodium carbonate, and treating this slightly alkaline clay with a cationic surface active agent.

Curiously, strongly acidic or strongly basic clays do not respond to the cationic surface active agent. Similarly, if the clay is slightly acidic, treatment with the cationic surface active agent is helpful, but the clay degrades on storage and the tendency to cluster and form slugs returns upon ageing as the pH of the treated clay returns to the acid side.

The pH referred to is the ph of the clay in water dispersion.

Apparently, and over a period of time, the natural acidity of the slightly acid clay reacts with the cationic surface active agent to destroy its effectiveness, and such action can be observed by the increased acidity of the clay.

The preferred cationic surface active agents used in the invention are illustrated by quaternary and diquaternary ammonium halides conveniently and desirably the chlorides, the gel-forming agents, e.g., those having a carbon to nitrogen ratio of from 10:1 to 30:1 being most effective.

it is particularly preferred to have present in either the quaternary or diquaternary ammonium chloride a single substituent having a long carbon chain of from 10–22 carbon atoms. These are desirably alkyl groups essentially lacking in carbon to carbon unsaturation. Straight chain alkyl groups are particularly contemplated.

Preferred compounds have a structural formula selected from the group consisting of:

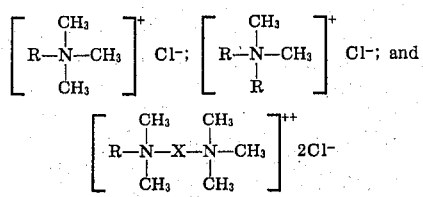

in which R is a hydrocarbon substituent desirably containing from 10–22 carbon atoms, preferably alkyl, and X is a divalent hydrocarbon chain containing from 1 to 10 carbon atoms, preferably the divalent alkylene radical:

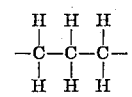

The dialkyl dimethyl ammonium chlorides are particularly outstanding in providing the greatest resistance to diffuser build-up and the longest term resistance to slug formation.

Further specific illustrations of cationic surface active agents which may be used in aaccordance with the invention are as follows;

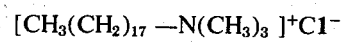

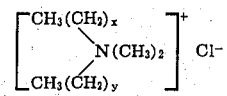

where x and y are 7, 9, 11, 13, 15 or 17 (mainly 11)

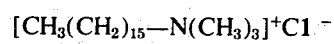

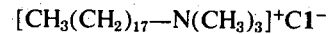

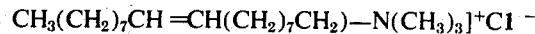

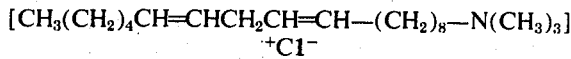

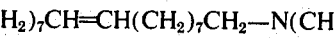

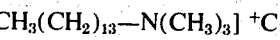

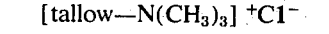

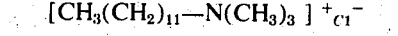

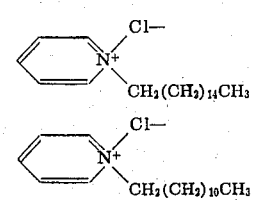

Note The terms coco and tallow in the above formulas indicate the hydrocarbon radicals derivable from the corresponding oil or fat.

As a matter of interest, clay is normally acidic and is frequently pretreated to render it relatively strongly basic in order to aid in the effective dispersion of the clay in the aqueous furnish. The alkaline treatment of the invention is generally inadequate to prevent the clay from depositing rapidly on the paper fibers and, moreover, alkaline-treated clay of the type under consideration is not normally considered desirable for an aqueous dispersion because its viscosity would be excessive.

It is also desirable to employ a binder to facilitate adhesion of the deposited clay to the fibers of the paper web. Such binder can be incorporated in the paper furnish or, more desirably, dry particles of binder material can be electrostatically deposited together with the clay with the binder and clay being mixed and deposited in admixture or by separately applying the binder and the clay either at the same or separate locations. Starch particles constitute a particularly preferred binder and these are desirably used in ungelatinized form to be at least partly gelatinized when elevated temperatures are applied to the wet paper in order to dry the same. Other binders such as casein, polyvinyl alcohol and the like may also be used.

While the present invention is particularly concerned with the production of paper on the conventional Fourdrinier machine, it will be appreciated that the invention is equally applicable to the production of paperboard and to the use of paper forming equipment other than the conventional Fourdrinier.

Referring more particularly to the process which is employed in accordance with the invention, a water wet sheet of fibrous cellulosic material is advanced past a particle deposition zone and electrostatically charged particles of dry clay are supplied to this zone, these charged particles repelling one another to becocme uniformly distributed while they are attracted to the wet paper web which is effectively grounded. In preferred practice, dry particles of ungelatinized starch are deposited along with the clay. The wet sheet with the starch and clay particles deposited on the surface thereof is then heated to dry the same and the deposited particles of starch or other binder become adherently related to the fibers of the paper and to the clay particles which are present.

Referring more particularly to the moisture content of the wet web at the point of particle deposition, it is important that there be present sufficient moisture to wet the clay particles so that the clay can then agglomerate into intimate contact with the paper fibers and binder particles which may be present. More particularly, a moisture content of from 25 percent to 95 percent by weight of water or more may be used. Particularly when dry binder particles are simultaneously applied, it is preferred that the web moisutre content at the time of particle deposition be at least about 45 percent by weight, preferably above 60 percent by weight. This is because at moisture contents of 45 percent or more, there is a greater opportunity for the deposited particles to be completely wetted by the water which is present.

It is desired to further point out that electrostatic deposition is essential. While the application of a dry powder to a wet paper web by mechanical distribution has been proposed, it has not developed commercially. Such a process would be of doubtful value because of the great air turbulence which exists at the surface of a fast moving web. This could create a serious dust problem which could not be controlled by practical means and thereby result in product loss, contamination and even the hazard of explosion. Moreover, uniform application is virtually impossible.

The electrostatic deposition utilized in this invention for applying particles on the surface of a paper web is not noticeably affected by the turbulence of the air near the wire. The operation is free from dust and substantially all of the particles are deposited on the web. Additionally, the charged particles in transit between the distributing equipment and the paper web repel each other so that there is no tendency for them to form agglomerates or clumps and the resulting cloud of material is exceptionally uniform and deposits on the sheet surface in a very uniform manner.

The difficulty as described previously is the fact that the clay particles blown to the electrostatic spray device which is utilized tend to form clusters which adhere to the spray heads and which break off from time to time in slugs which mar the paper.

The invention is illustrated in the accompanying drawing in which the single FIGURE illustrates a conventional paper making machine including means positioned above the Fourdrinier wire for depositing electrostatically charged particles on the wet paper web.

Referring more particularly to the drawing, the numeral 10 generically identifies a Fourdrinier machine comprising a head box 11, a slice 12, a breast roll 13, table rolls 14, and a couch 15 around which the wire 16 travels. The conventional dandy roll may be present if desired, but this roll is not shown. The conventional suction boxes are identified by the numeral 17. When the freshly formed wet paper web leaves the wire 16, it is moved to the presses, the press rolls being identified by the numeral 18 and the felts which transport the paper being identified by the numerals 19, 20 and 21.

The paper P as originally deposited from the head box 11 onto the wire in the vicinity of the breast roll 13 is mostly water and the water content is reduced progressively by drainage and then by suction to a level of roughly 80 percent in the vicinity of the couch roll 15. After the paper leaves the couch roll, it is passed to a press section where the press rolls 18 co-act to further express water from the paper web to still further reduce the water content of the paper and to further increase the internal strength of the sheet. Lastly, the partially dewatered web is passed to the dryers D which reduce the sheet moisture further to the level desired in the finished product.

In the illustrated form of the invention the electrostatically charged particles are deposited upon the upper or felt side of the paper P before the paper web is advanced between the first pair of press rolls 18. As can be seen, the particles are supplied as indicated by the arrow 22 through a header 23 and then, via tubes 24 to distributing heads 25 which are positioned above the surface of the paper P. a metered amount of finely divided particles is blown in, scattered by the distributing heads 25 and these particles are electrostatically charged so as to form a uniform cloud of particles within the chamber 26 which are propelled into association with the paper P by virtue of their electrostatic charge as has been described hereinbefore.

It is believed that triboelectric effects generated by contact between the propelled clay particles with the tubes 24 creates electrical effects which, if they are not counteracted as taught herein, will result in a tendency of the clay particles to gather in clusters which adhere to the distributing heads 25 and which drop off from time to time to mar the paper as previously described.

The proportion of cationic surface active agent is of secondary significance. Broadly, one can use from 0.001 to about 1 percent by weight, with amounts of from 0.01 percent to 0.5 percent being preferred. Larger amounts are also useful, but the economic disadvantage is obvious.

The particle application assembly may be positioned at various points along the travel of the Fourdrinier wire. It may be positioned between or in place of one of the sets of press rolls or it may be located between the last press rolls and the dryer section. The invention is not limited to operation on a Fourdrinier-type machine but is equally advantageous on cylinder or other types of machines.

While the embodiment illustrated in the drawing applies the clay particles on only one side of the paper, namely the felt side, it is possible to invert the paper and deposit particles on the other side, in which case the same problem of having clay particles cluster and form slugs exists.

Thus, and from the generic standpoint, a fibrous, absorbent, cellulosic sheet material in the form of a water-wet web is advanced beneath a paticle deposition zone and clay particles treated in accordance with the invention are electrostatically charged for mutual repulsion and supplied to the particle deposition zone so that they will be electrostatically attracted to and uniformly deposited upon the wet web in the form of separate particles. This web is then dewatered in conventional manner.

Intimate association of the clay particles with the paper fibers requires that there be considerable water present in the water-wet web, a web moisture content at the point of clay deposition being desirably at least 25 percent by weight, and more preferably at least 60 percent by weight. Indeed, and when the particle deposition zone is positioned above the Fourdrinier wire, the water content is normally considerably higher than 60 percent by weight.

Referring more particularly to the particle application assembly, the form of the invention illustrated employs known devices for projecting metered proportions of electrostatically charged particles in which the dry particles are fluidized with air and then blown through tubes 24 to the distributing heads 25 of a guntype device which imposes an electrostatic charge on the particles and projects the charged particles out over the wet paper web passing therebeneath. Devices of this type are available in commerce and are described, for example, in a publication entitled "Ransburg Electrostatic Powder Coating," published in 1966.

While such structures are preferred, it is also possible to employ other structures for accomplishing the same purpose such as an agitated inclined plate which is positioned over the paper web and charged so that particles delivered to the plate are charged and dropped from the lower end of the plate. Such structures are shown in U.S. Pat. No. 2,748,018.

The point to be observed is that irrespective of the equipment selected, the clay particles tend to cluster and form slugs which is detrimental and which is minimized in accordance with the invention.

In supplying particles in a metered amount, it is convenient to fluidize the dry particles with air and the dispersion so-formed is blown to the distributing heads, but it is also permissible to use other supply transport means, e.g., a screw conveyor, or a gravity fed venturi pump. The use of particles in bead form, these being produced by the cyclone drying of a slurry spray, is particularly helpful since these beads are easily stored in free flowing condition while breaking up easily in the fluid bed to be available as particles of smaller size when needed.

The invention will be illustrated by the utilization of clay particles in the convenient bead form just described.

EXAMPLE 1

A 1,000 gm. sample of clay was weighed out and poured into a tumbling drum. The tumbling drum was placed on a mill and rolled for 2 minutes. 7.5 mgs. of the treating agent mixed in a ratio of 1 to 3 with isopropyl alcohol was sprayed onto the tumbling clay. The clay was then allowed to tumble 30 minutes or until it dried.

The treated clay was placed in a Ransburg Electrostatic powder Coating gun and sprayed for 30 seconds with the diffuser in full rotation. without turning the gun off, all diffuser rotation was stopped and the charge was continued for 30 seconds. Then the charge was turned off, and the particles clinging to the diffuser (diffuser build-up) were brushed into a weighing dish and weighed. During operation, the dropping off of slugs was observed visually. The following results were obtained.

Table I

| Treating Agent | | pH | Slugging and Diffuser Build-Up | Diffuser Build-Up (In Grams) |
|---|---|---|---|---|
| None | New | 6.7 | Yes | 3.7 |
| | Aged* | 6.7 | Yes | 3.7 |
| Cationic Agent 1 | New | 7.4 | No | .9 |
| | Aged* | 6.9 | Yes | 3.3 |
| Cationic Agent 2 | New | 7.3 | No | 1.4 |
| | Aged* | 6.7 | Yes | 3.8 |
| Cationic Agent 1 | Octadecyl trimethyl ammonium chloride (50% solids solution in a mixture of 35 parts isopropanol and 13.5 parts water) | | | |
| Cationic Agent 2 | Dialkyl dimethyl ammonium chloride in which the alkyl groups are predominantly dodecyl groups but small proportions of octyl, decyl, tetradecyl, hexadecyl and octadecyl groups also being present (75% solids solution in a mixture of 17 parts isopropanol and 7.5 parts water). | | | |

*Aged 1 week

EXAMPLE 2

Example 1 was repeated with the exception that the clay beads were first treated with a mild alkali (aqueous sodium carbonate) to modify the clay to provide a pH in water of approximately 8 prior to treatment with the cationic surface active agent as in Example 1. The following results are obtained.

| Treating Agent | | Diffuser Build-Up (In Grams) | Slugging |
|---|---|---|---|
| None | New | 3.7 | Yes |
|  | Aged | 3.7 | Yes |
| Cationic Agent 1 | New | .3 | No |
|  | Aged | .45 | No |
| Cationic Agent 2 | New | .6 | No |
|  | Aged | 1.1 | Yes |

"As can be seen, the use of mild alkali to modify the pH to a slightly alkaline condition causes the cationic agent to become even more effective in minimizing diffuser build-up." Moreover, after ageing, diffuser build-up remains low, and when monoalkyl trimethyl ammonium chlorides are selected, the aged composition continues to resist slug formation.

To clays treated as described above are utilized in the paper making process described hereinbefore in order to minimize the diffuser build-up and slugging problems which are encountered. If desired, a small proportion of titanium dioxide may be included in the clay which is applied to enhance whiteness.

While the amount of clay which is used in the paper making process is of secondary consideration, it is customary to deliver approximately 1 pound per minute of clay per distributing head. Thus, one would use as many distributing heads as are required to supply the clay needed for the task at hand and with due regard for the speed of the paper.

I claim:

1. In the electrostatic application of dry clay to an advancing water-web web of fibrous cellulosic sheet material, the steps of reacting finely divided particles of normally acidic clay with an alkaline agent to provide a pH in aqueous medium of from 7.0 – 8.5, coating the so-modified particles of clay with at least 0.001 percent by weight of a cationic surface active agent which is a quaternary ammonium chloride having a ratio of carbon to nitrogen of from 10:1 to 30:1 and having a structural formula selected from the group consisting of:

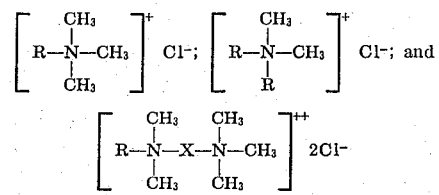

in which R is a hydrocarbon radical containing from 10–22 carbon atoms and X is a divalent aliphatic hydrocarbon radical containing from 1–10 carbon atoms, supplying said coated clay particles to a particle deposition zone above said advancing water-wet. web, electrostatically charging said coated clay particles in said particle deposition zone to electrostatically deposit said clay particles upon said wet web and thereby counter the tendency of the unmodified clay to cluster and form slugs which drop upon and mar said web.

2. A method as recited in claim 1 in which said quaternary ammonium chloride is a monoalkyl trimethyl ammonium chloride.

3. A method as recited in claim 1 in which said quaternary ammonium chloride is a dialkyl dimethyl ammonium chloride in which the alkyl groups are from 10–22 carbon atoms in length.

4. A method as recited in claim 3 in which said clay is in bead form.

5. A method as recited in claim 1 in which said sheet material is paper and the web moisture content at the point of clay deposition is at least 25 percent by weight.

* * * * *